United States Patent
Hao et al.

(10) Patent No.: US 7,627,595 B2
(45) Date of Patent: Dec. 1, 2009

(54) APPARATUS, METHOD, AND COMPUTER PROGRAM PRODUCT FOR SYNCHRONIZING DATA SOURCES

(75) Inventors: Jianxiu Hao, Lexington, MA (US); Diego S. Rozensztejn, Brookline, MA (US); Jian Huang, Woburn, MA (US); Muralikumar Venkatasubramaniam, Lowell, MA (US)

(73) Assignee: Verizon Data Services Inc., Basking Ridge, NJ (US)

( * ) Notice: Subject to any disclaimer, the term of this patent is extended or adjusted under 35 U.S.C. 154(b) by 294 days.

(21) Appl. No.: 11/567,325

(22) Filed: Dec. 6, 2006

(65) Prior Publication Data
US 2008/0140693 A1      Jun. 12, 2008

(51) Int. Cl.
G06F 17/00 (2006.01)
G06F 17/30 (2006.01)

(52) U.S. Cl. ................ 707/101; 709/214
(58) Field of Classification Search ........ 707/100, 707/101, 200, 201, 8, 202, 204, 205, 206; 715/212, 220, 227; 709/214
See application file for complete search history.

(56) References Cited
U.S. PATENT DOCUMENTS

| | | | |
|---|---|---|---|
| 5,758,355 A * | 5/1998 | Buchanan | 707/201 |
| 6,920,486 B2 * | 7/2005 | Kiiskinen | 709/214 |
| 7,020,662 B2 * | 3/2006 | Boreham et al. | 707/104.1 |
| 7,290,017 B1 * | 10/2007 | Wang et al. | 707/204 |
| 2005/0091240 A1 * | 4/2005 | Berkowitz et al. | 707/100 |
| 2008/0021908 A1 * | 1/2008 | Trask et al. | 707/100 |

* cited by examiner

Primary Examiner—Greta L Robinson

(57) ABSTRACT

A method is provided for synchronizing data sources. The method includes receiving at least first and second data tables. The data tables have one or more mutually similar fields and one or more dissimilar fields from one another. First normalized, second normalized, and intermediate data tables are stored, each including respective first normalized, second normalized, and intermediate data table fields that each correspond to the mutually similar fields of the first and second data tables. The first normalized data table is at least partially populated with corresponding entries from the first data table and the second normalized data table is at least partially populated with corresponding entries in the second data table. Intermediate data table entries are respectively replaced with corresponding inconsistent data entries of the first and second normalized data tables. An apparatus and a computer program product for accomplishing the above method are also provided.

11 Claims, 6 Drawing Sheets

APPARATUS, METHOD, AND COMPUTER PROGRAM PRODUCT FOR SYNCHRONIZING DATA SOURCES

BACKGROUND INFORMATION

Address books, including electronic address books, are widely used. In many cases, such electronic address books are associated with a particular application, a particular device or data source, or both. When an individual user maintains multiple address books, it may be desirable to synchronize the various address books such that each address book contains current information. However, it can be tedious to manually update each address book with the same information. As such, some methods of synchronizing address books in a somewhat automated fashion have been developed.

For existing automated synchronization methods, address book synchronization is usually limited to synchronization between two data sources that have the same data schema (e.g., data sources including data tables having the same table fields). However, synchronizing data between data sources with dissimilar data schema remains a challenge.

BRIEF DESCRIPTION OF THE SEVERAL VIEWS OF THE DRAWING(S)

DETAILED DESCRIPTION OF PREFERRED EMBODIMENTS

Exemplary embodiments now will be described hereinafter with reference to the accompanying drawings, in which exemplary embodiments and examples are shown. Like numbers refer to like elements throughout.

Figure 1:
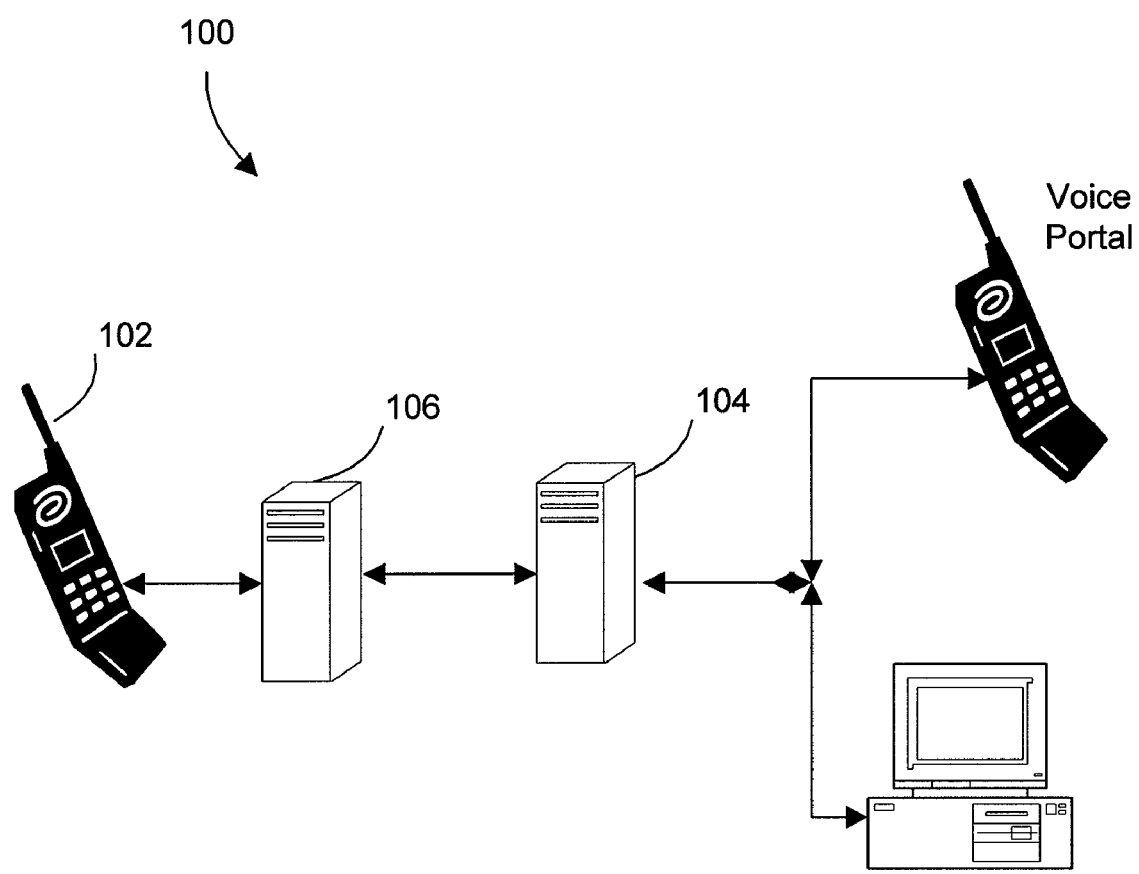
FIG. 1 is a schematic view of a system for synchronizing data sources configured in accordance with an exemplary embodiment.
Figure 2:
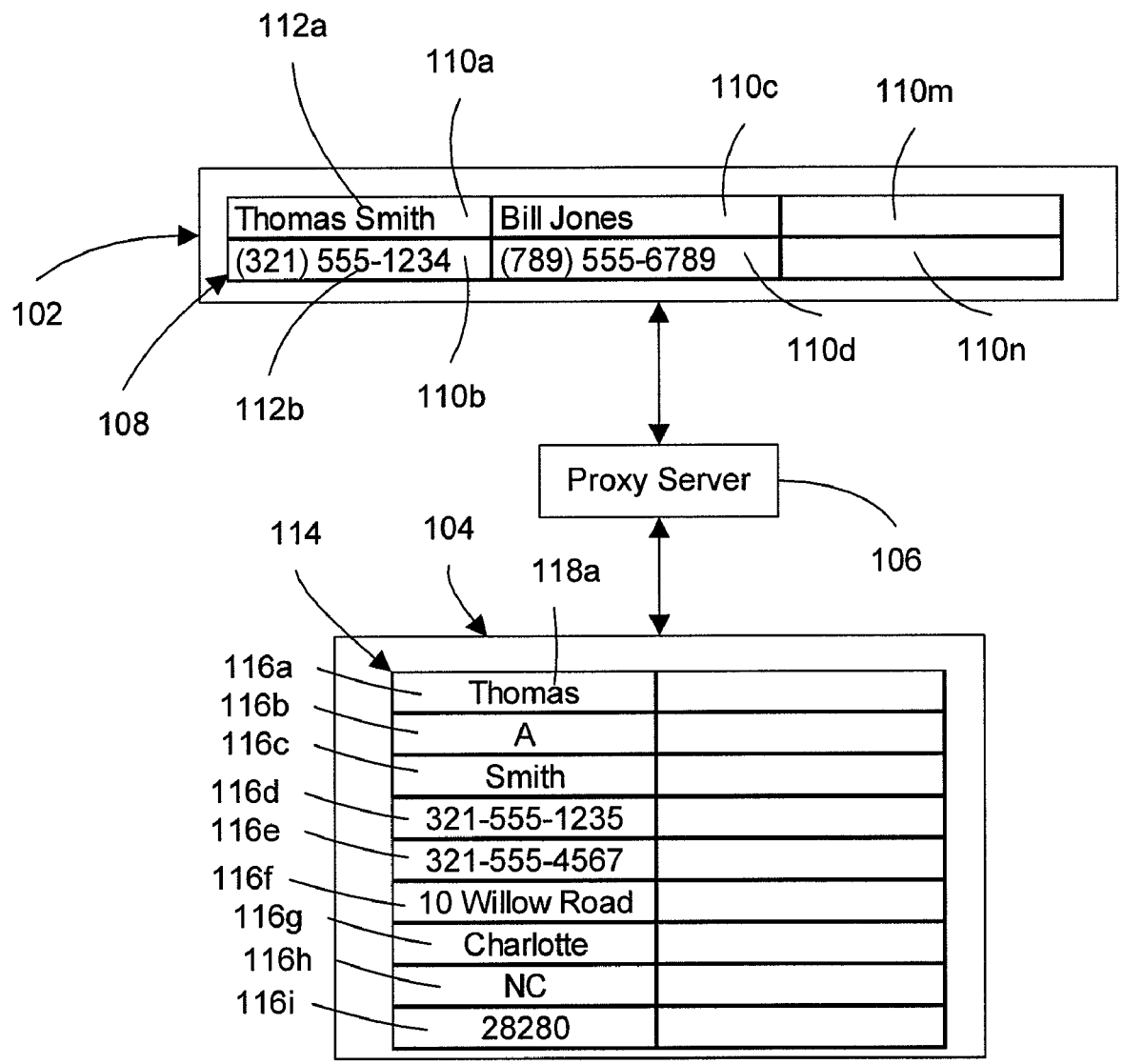
FIG. 2 is a schematic view of the system of FIG. 1, exemplifying data tables associated with the two data sources.
Figure 3:
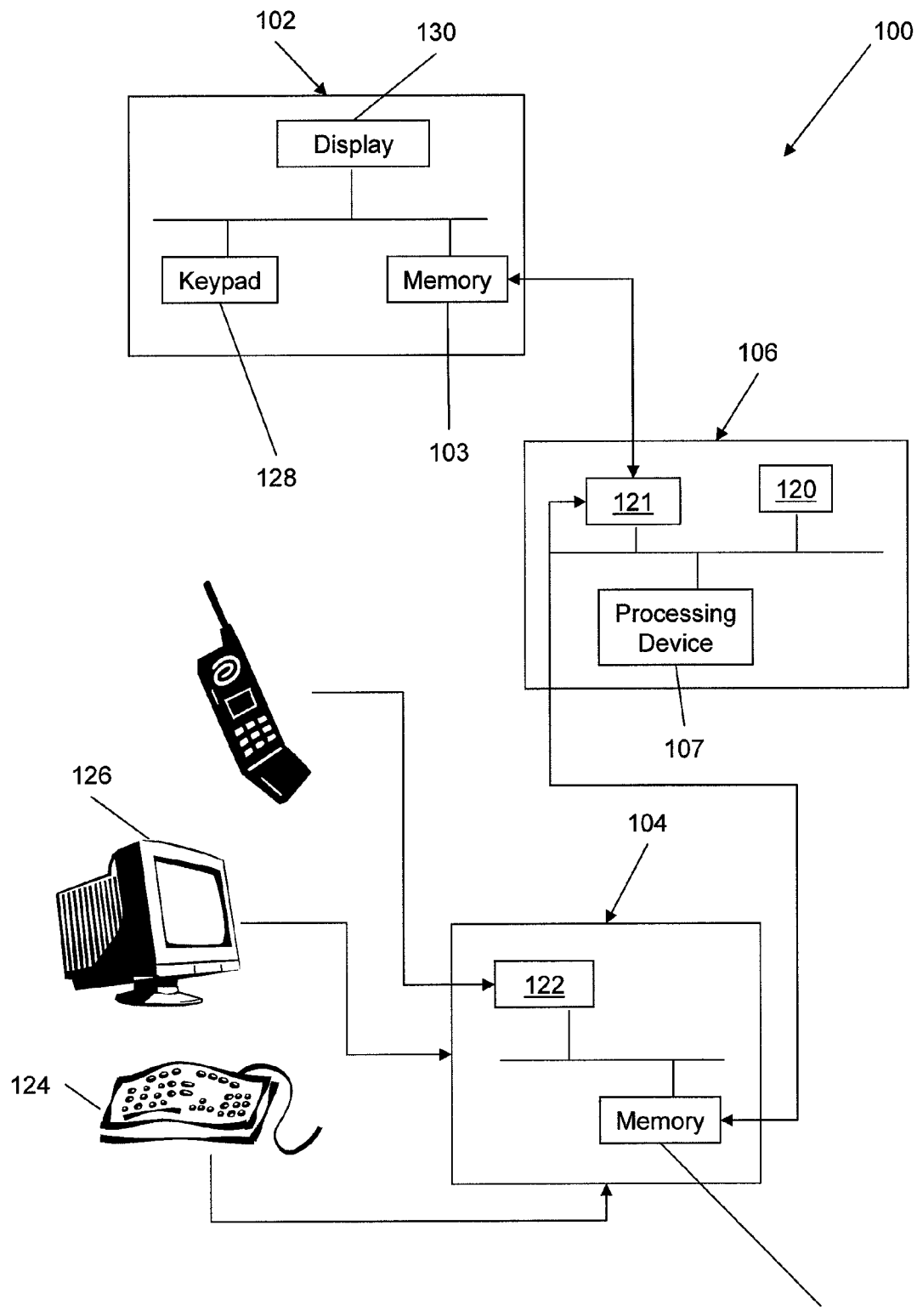
FIG. 3 is a schematic view of the system of FIG. 1, exemplifying a hardware configuration for the various components.
Figure 4A:
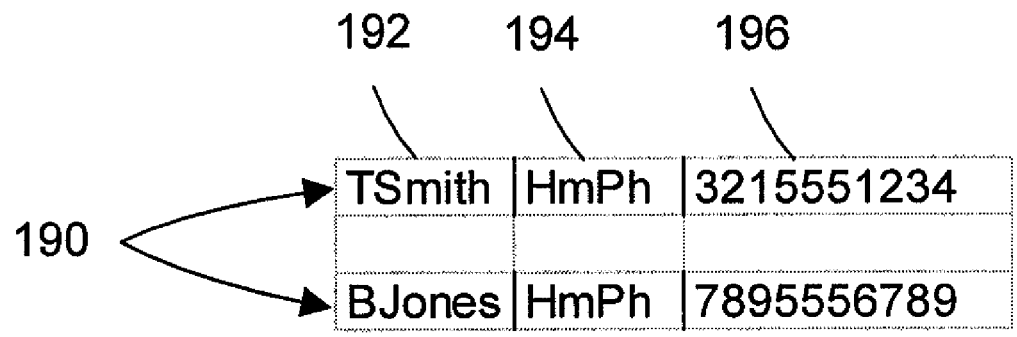
FIGS. 4a and 4b show an embodiment of a data format for data strings that may be passed between the data sources and the proxy server.
Figure 4B:
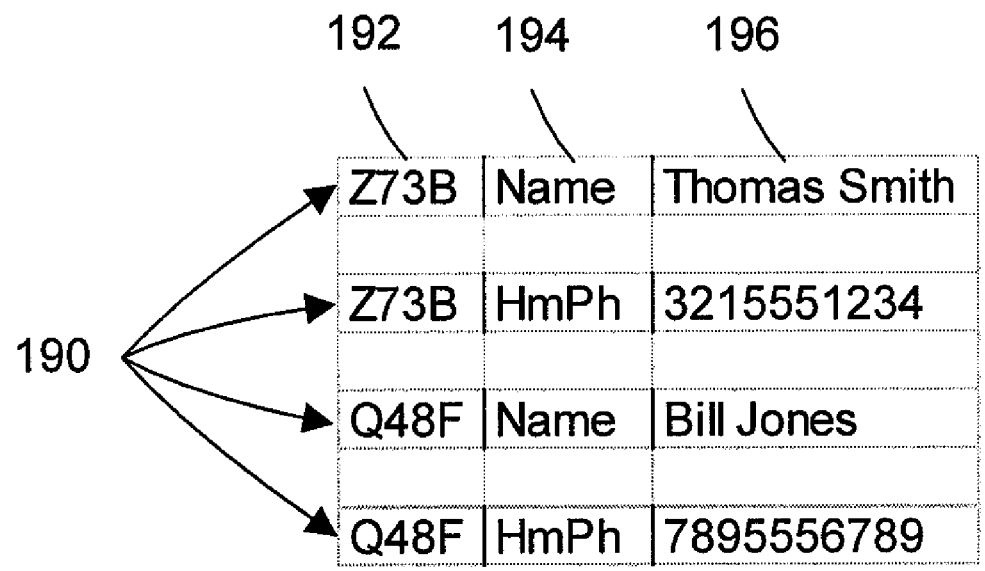

Referring to FIGS. 1-3, therein is shown a system 100 for facilitating synchronization of data tables, such as address books, the system 100 being constructed in accordance with an exemplary embodiment. System 100 includes several data sources, including a mobile device, such as cellular telephone 102 or mobile data device, and a storage unit, such as server 104. A processing unit, proxy server 106 in the illustrated embodiment, communicates with cellular telephone 102 and server 104.

Cellular telephone 102 includes a first data table 108, stored, for example, in a memory 103 or other storage device of cellular telephone 102. First data table 108 has one or more fields 110a-n, some or all of which may be populated with data entries of varying types. In the illustrated embodiment, data entries 112a-d populate four of the fields 110a-d, while other fields remains empty. In the illustrated embodiment, the data entries 112a-d are indicative of persons' names and associated telephone numbers, although other types of data can be contained in the fields 110a-n, including textual, numeric, and/or symbolic data indicative of any information, including, for example, an address, a fax number, a birthday, an email address, a bank statement, a calendar, etc. First data table 108 can have any number of fields.

Another data table, second data table 114, is associated with, for example, may be stored in a memory 105 of, server 104. Second data table 114 has one or more fields 116a-n, some or all of which may be populated with data entries of varying types. In the illustrated embodiment, data entries 118a-i populate nine of the fields 116a-i, while other fields remain empty. In the illustrated embodiment, the data entries 118a-i are indicative of a person's name, separated into first name, middle initial, and last name fields, and associated address and plurality of telephone numbers, although other types of data can be contained in the fields 116a-n. Second data table 114 can have any number of fields.

It is noted that first and second data tables 108, 114 include one or more mutually similar fields for storing overlapping types of data. For example, fields 110a and 110c of first data table 108 are fields for storing name-type data, as are fields 116a-c of second data table 114. These fields are therefore referred to as being similar, in that they store overlapping types of data to the extent that there is at least some, albeit incomplete, coincidence of the content of the data. The same statements apply to fields 110b, 110d, and 116d (and possibly 116e), which are all configured to store telephone number data. Also, it is noted that field 110a and fields 116a-c all store name information for "Thomas Smith," although in second data table 114, the full name stored is "Thomas A. Smith." Further, the name information of first data table 108 is formatted differently than the name information of second data table 114, in the prior case being contained in a single field 110a and in the latter case being split between three fields 116a-c. As such, fields 110a and 116a-c are referred to as related or corresponding, and data entry 112a corresponds to, but is not coincident with, data entries 118a-c. A key can be associated with each of the fields of a data table in order to indicate correspondence of different fields. In one embodiment, the name field can act as the key, such that all data entries can be associated with a name entry, although other keys, such as a numerical indicator associated with all related fields, can also be used.

One or both of the first and second data tables 108, 114 may also have one or more dissimilar fields for storing types of data that are exclusive to the respective table. For example, in the illustrated embodiment, second data table 114 includes data related to an address in fields 116f-i, while first data table 108 is not configured to store address-type data. In this case, the address fields 116f-i are referred to as dissimilar fields, associated only with the second data table 114 and having no counterpart fields from the first data table 108 configured to store that type of information. In this illustrated embodiment, field 116e also is a dissimilar field, in that it pertains to a second telephone number (for example, a facsimile number) to be associated with a person's name, while the first data table 108 lacks such a field.

Referring to FIGS. 1-3, 4a, and 4b, proxy server 106 can be configured to identify corresponding inconsistent data entries of corresponding fields of the first and second data tables 108, 114. As used herein, corresponding data entries are those entries in different data tables that refer to the same substantive data, e.g., the data entries of two different data tables that each refer to the same home telephone number for the same person. For example, proxy server 106 may include a communications device 121, such as a network connector and/or wireless modem, a processing device 107, and a memory 120 or other storage device, all in communication with each other. The communications device 121 may facilitate receipt of first and second data tables 108, 114 for storage in memory 120. Processing device 107 may then compare the data entries of fields that are determined to be corresponding. For example, each field may be represented by a data string 190 including a key 192 (in this case, "TSmith"), a data-type identifier 194 (here, "PhHm" for home telephone number), and substantive data 196 (e.g., 1234567890), each separated by a character separator, "|". The key 192 indicates the group to which the data string 190 belongs (e.g., for address book data, the key 192 may refer to a specific person or contact), and the data-type identifier indicates the type of data (e.g., home telephone number) involved. Processing device 107 may use key 192 and data-type identifier 194 to ascertain correspondence information for the data string 190 representing the field, that is, to identify other data entries in the same or different data table(s) that refer to the same substantive data. Other formats for data string 190 are also possible.

As an example, processing device 107 might compare the entry 112a of field 110a to the data entries 118a-c of fields 116a-c. This could be done, for example, by concatenating the entries 118a-c and then comparing the aggregated entry to entry 110a. Other methods of comparison are also possible. Again referring to the illustrated embodiment, processing device 107 might compare the telephone number data 112b, 118d in fields 110b, 116d, thereby determining that the entries are not consistent. Processing device 107 can perform the above described tasks, for example, under control of, i.e., executing, software stored in memory 120, or in other ways.

In response to the above comparison, proxy server 106 may generate a dissimilarity indicator for communication to cellular telephone 102 and/or server 104. This dissimilarity indicator, for example, can be a signal describing the differences between the compared corresponding entries of corresponding fields. Referring to the above example, comparison of data entries 112b and 118d might yield a signal, for transmission to cellular telephone 102, indicating that the last "4" has been changed to a "5" (or a signal indicating just the opposite for transmission to server 104). The signal may allow modification of the first and/or second data tables 108, 114 so as to synchronize, e.g., set to equal values, the corresponding fields of the first and second data tables 108, 114. For example, the signal may include one or more instructions governing modification of the first and/or second tables by the cellular telephone 102 and/or server 104, respectively, or may allow modification by the processing device 107 and subsequent transmission of the modified entry to the cellular telephone 102 and/or server 104 via the communications device 121 for replacing entries stored locally. Referring to the illustrated embodiment, the processing device 107 may produce and/or execute an instruction that that causes the telephone number 118d stored in field 116d to be changed from its present value to the value stored in field 110b.

Server 104 may communicate with one or more user interfaces, such as a voice portal 122 to be accessed from a telephone, or a user input device, such as a keyboard 124, and a display device 126. These user interfaces may allow a user to manually alter the data entries in the second data table 114, as well as to view the entries of the second data table. Similarly, cellular phone 102 may include or otherwise be associated with one or more user interfaces, such as a keypad 128 and/or an LCD display screen 130, that allow interaction with the first data table 108.

In some embodiments, the proxy server 106 determines a priority between the corresponding inconsistent data entries, for example, via processing device 107. This determination of priority allows the processing device 107 to determine which of two inconsistent data entries from corresponding fields should be replaced. Referring to the illustrated embodiment, field 110b of first data table 108 includes telephone number "321 555 1234" (data entry 112b), while field 116d of second data table 114 includes telephone number "321 555 1235" (data entry 118d). In the present example, these data entries both refer to a telephone number for the same person, and they are therefore corresponding data entries. However, the data entries are not coincident, and they are therefore corresponding inconsistent data entries. If the processing device 107 determines that the data entry 118d of field 116d has a higher priority, then the data entry 118d will be used to replace the data entry 112b, such that field 110b will include the telephone number "321 555 1235." As such, the fields 110b and 116d are ultimately synchronized. Examples of how priority might be determined are provided below.

The above priority determinations can be made independently for each set of corresponding inconsistent data entries. For example, looking at the respective telephone number fields 110b, 116d and respective name fields 110a, 116a-c of the first and second data tables 108, 114, a higher priority may be given to the telephone number in field 110b of first data table 108, such that data entry in field 116d is replaced with the telephone number in field 110b. Simultaneously, a higher priority may be given to the name data in fields 116a-c of second data table 114, such that these data from second data table 114 are used to replace the name entry in first data table 108. This process may be repeated for some or all of the fields of the first and second data tables.

Figure 5:
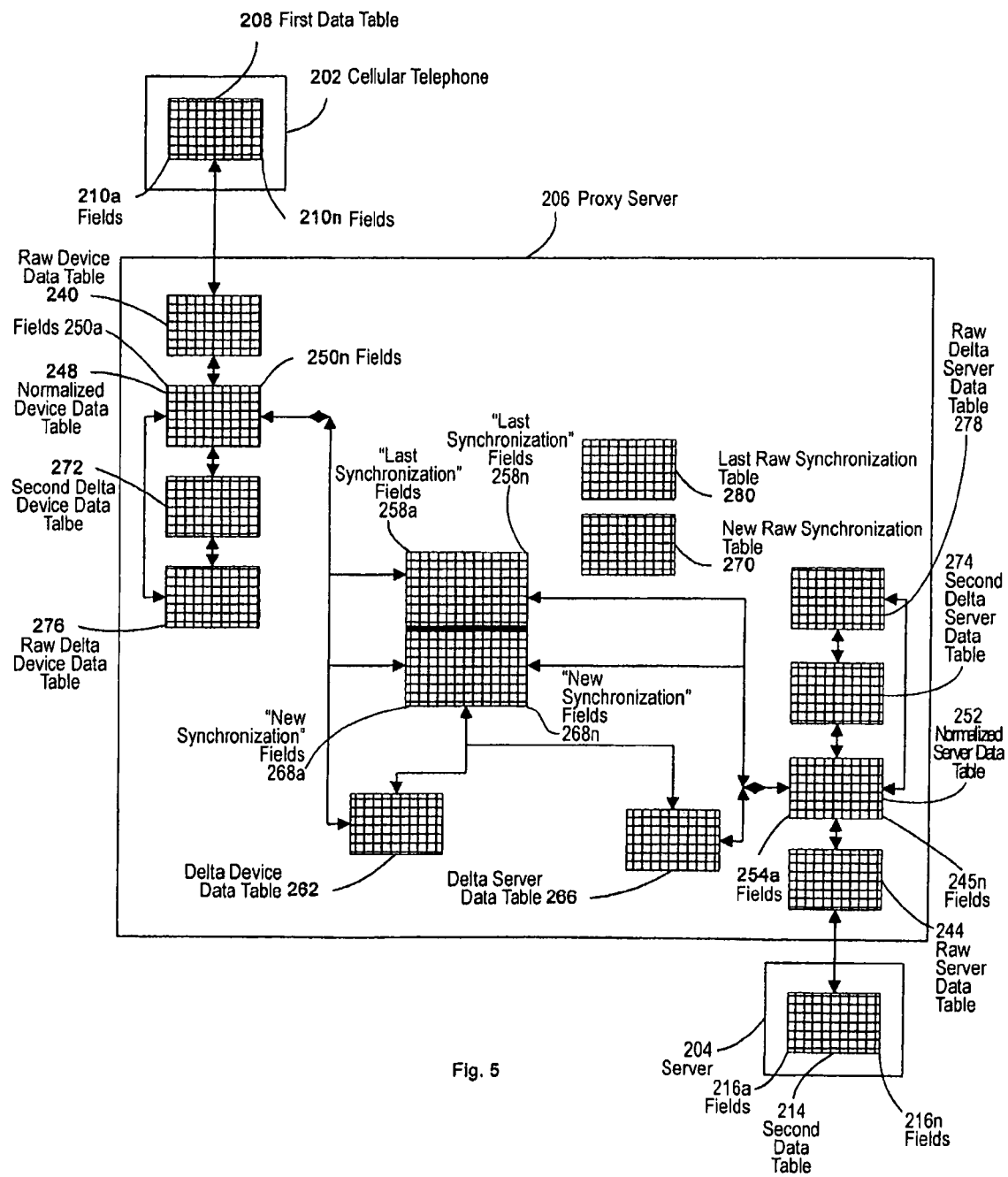
FIG. 5 is a schematic view of the proxy server and two data sources, showing exemplary data tables contained therein.
Figure 6:
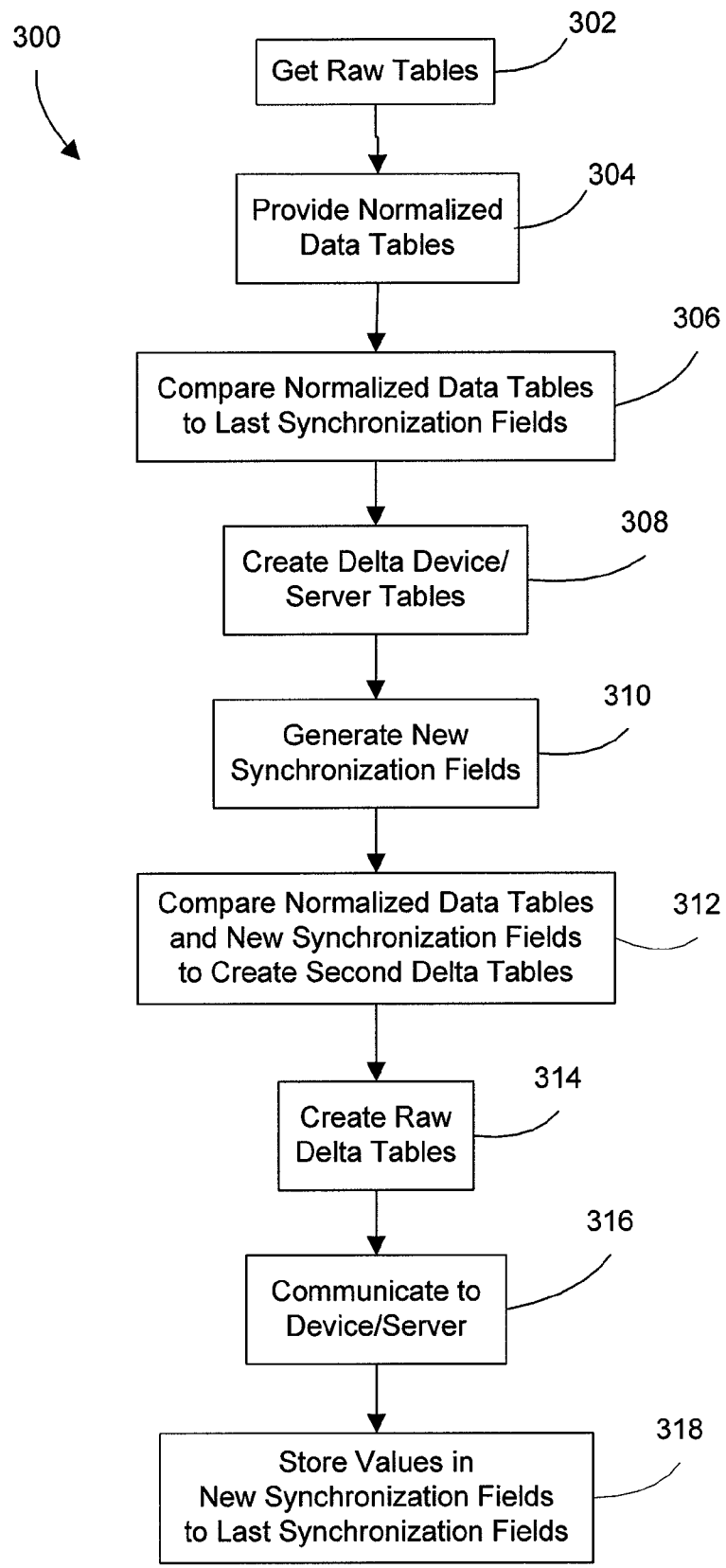
FIG. 6 is a flowchart representing a method for synchronizing data sources, the method being in accordance with an exemplary embodiment.

Referring to FIGS. 5 and 6, therein is shown a schematic representation of the operation of a system 200 for synchronizing data tables, the system including a proxy server 206 that employs a method 300 of determining priority between corresponding inconsistent entries of first and second data tables 208, 214 respectively associated with a communications device, such as cellular telephone 202, and a storage unit, such as server 204. Raw device data table 208 and raw server data table 214 could be, for example, electronic address books maintained in the cellular telephone 202 and server 204, respectively. Entries in raw tables 208, 214 may be in any format, the format being dictated, in some embodiments, by the type of device within which each table is stored.

At Block 302, first and second data tables 208, 214 are received at proxy server 206 and stored as raw device data table 240 and raw server data table 244, respectively. In some embodiments, this may amount to completely importing and storing first and second data tables 208, 214 in proxy server 206. Fields of the data tables may be associated with identifying information, such as a key and data-type identifier.

Raw device table 240 and raw server table 244 are utilized by the proxy server, at Block 304, to generate normalized device data table 248 and a normalized server data table 252, respectively. Fields 250a-n, 254a-n in the normalized tables 248, 252 correspond to mutually similar fields of the raw device table 208 and raw server table 214, perhaps determined by the proxy server using key and data-type identifiers. Data entries in fields 210a-n and 216a-n of raw data tables 208, 214 may be normalized or placed in a common format by the proxy server, with the normalized entries used to populate the normalized tables 248, 252. Producing data entries in a common format may, in some cases, involve several steps. For example, referring to data entries 112a and 116a-c of FIG. 2, name information in fields 116a-c can be aggregated into a single name entry similar to that in field 112a. Then, both the name data in field 112a and the aggregated name data from fields 116a-c can be reformatted, say, to be formed entirely of lower case lettering. In other cases, normalization may require fewer steps. For example, in order to normalize the telephone number data entries of fields 112b and 116d, the telephone number data could be formed entirely of numerals (removing parentheses and hyphens). Each normalized data entry could be associated with a key, such as a numerical identifier or the entry in the name field.

The proxy server 206 can include an intermediate data table 256 having intermediate data table fields, such as "last synchronization" fields 258a-n and "new synchronization" fields 268a-n, each set of fields corresponding to the mutually similar fields of the raw device and raw server data tables 240, 244 (i.e., each set of the last synchronization fields and new synchronization fields includes all of the same fields as found in the normalized data tables 248, 252). At Block 306, data entries from fields 250a-n and 254a-n of the normalized device and server data tables 248, 252 are respectively compared by the proxy server to corresponding data entries in last synchronization fields 258a-n. For each case where a data entry in normalized device table 248 is inconsistent with, e.g., does not equal, the corresponding data entry in the corresponding field of the last synchronization fields 258a-n, the proxy server stores the data entry in the normalized device table 248, at Block 308, to a delta device data table 262 (also maintained by the proxy server) along with a modification instruction, such as an indicator as to whether the corresponding data entry of the normalized device table 248 has been added (i.e., exists in normalized data table 248 but not in last synchronization fields 258a-n), deleted (i.e., exists in last synchronization fields 258a-n but not in normalized data table 248), or updated (i.e., exists in both normalized data table 248 and last synchronization fields 258a-n, but is dissimilar between the two) since the preceding synchronization (the preceding synchronization being represented by last synchronization fields 258a-n, as discussed below). The same comparison is made by the proxy server between the data entries in normalized server table 252 and the corresponding data entries in the corresponding fields of the last synchronization fields 258a-n, and inconsistent data entries in the normalized server table 252 are stored to a delta server data table 266 (also maintained by the proxy server) along with an indicator as to whether each data entry has been added, deleted, or updated since the last synchronization. The delta tables 262, 266 therefore serve as indications of dissimilarity between the normalized data tables 248, 252 and the last synchronization fields 258a-n.

At block 310, entries of the delta tables 262, 266 may be utilized with the last synchronization fields 258a-n to produce the new synchronization fields 268a-n. For example, entries in last synchronization fields 258a-n may be copied to new synchronization fields 268a-n, and then the entries in new synchronization fields 268a-n may be modified as specified in delta device and server tables 262, 266. New synchronization fields 268a-n therefore represent an updated set of data entries of the normalized device and server tables 248, 252. A new raw synchronization table 270 containing non-normalized (that is, in a format as received by the proxy server rather than the standardized format imposed by the proxy server; original or raw format in some embodiments) counterpart data entries to those of the new synchronization fields 268a-n can also be generated by the proxy server, either subsequent to or in parallel with generation of the new synchronization fields 268a-n.

At Block 312, normalized device data table 248 and normalized server data table 252 are each compared by the proxy server to the corresponding fields of the new synchronization fields 268a-n to produce second delta device data table 272 and second delta server data table 274, respectively. For example, this process may proceed in a fashion similar to that described in conjunction with Block 308. Each of second delta device data table 272 and second delta server data table 274 is indicative of changes to be made to the normalized device and server data tables 248, 252, respectively, and ultimately to first and second data tables 208, 214 of cellular telephone 202 and server 204, respectively, in order to synchronize the two.

As illustrated above, second delta device data table 272 and second delta server data table 274 serve as indicators of dissimilarity between normalized device table 248 and normalized server table 252 before the synchronization process. It is also noted that the system has determined a priority between corresponding, but mutually inconsistent, data entries of the normalized device and server data tables 248, 252, in that the respective entry that differs from that contained in the corresponding field of the new synchronization fields 268a-n is the one that is assumed to have priority and dictate modification of the other. In cases where corresponding entries of normalized device and server data tables 248, 252 are both inconsistent with the corresponding data entry in the new synchronization fields 268a-n, priority can be determined in other predefined manners. For example, a time of most recent editing can be related to each of the data entries and the later one in time may take priority, or a convention can be utilized, such as a convention in which the entry from the server always takes priority over the data entry initiated in the cellular telephone.

At Block 314, for each data record in second delta device data table 272, the corresponding normalized data entry of the normalized device data table 248 is used to create one or more equivalent data entries in non-normalized format (e.g., by retrieving such entries from new raw synchronization table 270) that are stored to raw delta device data table 276. Also, for each data record in second delta server data table 274, the corresponding normalized data entry of the normalized server data table 252 is used to create one or more equivalent data entries in non-normalized format that are stored to raw delta server data table 278. Once the raw delta tables 276, 278 are formed, these can be transmitted, at Block 316, to the cellular telephone 202 and server 204, respectively, in order to allow updating and synchronizing of the first and second data tables 208, 214.

At Block 318, the data entries stored in new synchronization fields 268a-n may be saved to last synchronization fields 258a-n. Last synchronization fields 258a-n therefore serve as a record of the status of the device and server data tables at the time of the last completed synchronization process. Last synchronization fields 258a-n are then ready for utilization in subsequent synchronization processes. A last raw synchronization table 280 can also be stored in the proxy server, the entries in last raw synchronization table 280 being the non-normalized equivalents to the entries saved to the last synchronization fields 258a-n.

In some embodiments, the proxy server will track each subsequent synchronization event, for example, by generating a unique key associated with a synchronization event, or by incrementing a counter following each synchronization event. The key/counter may be maintained, for example, in the proxy server, as well as in the devices for which data tables are being synchronized. In one embodiment, the key/counter stored in each device involved in a synchronization event will be compared to the key/counter stored in other devices involved in the synchronization event. For example, the proxy server may, when updating new synchronization fields 268a-n from one or both of the delta server and/or device tables 262, 266, compare the key/counter between two devices undergoing synchronization. If the key/counter is not the same for each device, the proxy server may ignore any instructions stored in the delta server and/or device tables 262, 266 indicating deletion of entries. The proxy server may be configured to ignore deletion instructions for one specific device in the pair being synchronized or for both devices being synchronized.

It should be noted that functions of the above process may be distributed in a variety of ways between the cellular telephone, the server, and the proxy server. For example, while the process has been described as involving receipt by the proxy server of data tables from a cellular telephone and server, and subsequent normalization of those data tables at the proxy server, it is also possible for the cellular telephone and/or server to normalize the data tables locally and transmit the normalized tables to the proxy server for further processing. This interchangeability of equipment carrying out the above functions is present for most, if not all, steps of the above described process.

FIG. 6 is a flowchart of a method according to an exemplary embodiment, and this flowchart is also representative of a system and program product according to exemplary embodiments. It will be understood that each block or step of the flowchart, and combinations of blocks in the flowchart, can be implemented by various means, such as hardware, firmware, and/or software including one or more computer program instructions. In this regard, the computer program instructions which embody the procedures described above may be stored by a memory device of a computing device, such as the control server or the portals, and executed by a built-in processor of the computing device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In the preceding specification, various embodiments of the claimed invention have been described. It will, however, be evident that various modifications and changes may be made thereunto without departing from the broader spirit and scope of the invention as set forth in the claims that follow. For example, many of the above examples have referred to multiple tables stored in a memory or other storage device. However, it should be understood that some, if not all, of the tables discussed might be integrated into a single table or a smaller number of tables, with each such table including fields corresponding to what was formerly termed a "table." Also, many of the above examples have focused on synchronization between two data tables stored in two independent devices, and data tables stored in a cellular telephone and a server. However, the present invention is not so limited, but can be applied in synchronizing any number of data tables contained in any number of separate devices. The specification and drawings are accordingly to be regarded in an illustrative rather than restrictive sense.

That which is claimed:

1. A method comprising:
   receiving at a server device at least a first data table from a first client device and a second data table from a second client device, the data tables having one or more mutually similar fields and one or more dissimilar fields from one another, the similar fields storing overlapping types of data with at least some coincidence of the content of the data, the dissimilar fields storing types of data exclusive to the respective table;
   formatting the first and second data table entries to have a common format;
   storing on the server device first normalized, second normalized, and intermediate data tables with respective first normalized, second normalized, and intermediate data table fields each corresponding to the mutually similar fields of the first and second data tables;
   at least partially populating the first normalized data table with corresponding formatted entries from the first data table and the second normalized data table with corresponding formatted entries from the second data table; and
   respectively replacing intermediate data table entries stored on the server with corresponding inconsistent data entries of the first and second normalized data tables.

2. A method according to claim 1, further comprising, subsequent to respectively replacing intermediate data table entries with corresponding inconsistent first and second normalized data table entries, generating modified first and second normalized data tables by respectively replacing data entries of the first and second normalized data tables with corresponding inconsistent intermediate data table entries.

3. A method according to claim 1, further comprising, generating modified first and second data tables respectively consistent with the modified first and second normalized data tables.

4. The method according to claim 1, wherein receiving at least first and second data tables includes communicating with at least one mobile device, and further comprising transmitting at least one of the modified first and second data tables for a mobile device.

5. A method according to claim 4, wherein transmitting at least one of the modified first and second data tables for the mobile device further comprises formatting the transmitted data tables in an original format received by the server device from the mobile device.

6. A method according to claim 1, wherein formatting the first and second data table entries to have a common format further comprises at least one of converting into lower case lettering and removing parentheses and hyphens.

7. A computer program product comprising a computer-readable storage medium having computer-readable program code portions stored therein, the computer readable program code portions comprising:

a first executable code portion for receiving at least first and second data tables having one or more mutually similar fields and one or more dissimilar fields from one another, the similar fields storing overlapping types of data with at least some coincidence of the content of the data, the dissimilar fields storing types of data exclusive to the respective table;

a second executable code portion for storing first normalized, second normalized, and intermediate data tables with respective first normalized, second normalized, and intermediate data table fields each corresponding to the mutually similar fields of the first and second data tables;

a third executable code portion for formatting the first and second data table entries to have a common format and at least partially populating the first normalized data table with corresponding formatted entries from the first data table and the second normalized data table with corresponding formatted entries from the second data table; and a fourth executable code portion for respectively replacing intermediate data table entries with corresponding inconsistent data entries of the first and second normalized data tables.

8. A computer program product according to claim 7, further comprising a fifth executable code portion for, subsequent to respectively replacing intermediate data table entries with corresponding inconsistent first and second normalized data table entries, generating modified first and second normalized data tables by respectively replacing data entries of the first and second normalized data tables with corresponding inconsistent intermediate data table entries.

9. A computer program product according to claim 8, further comprising a sixth executable code portion for generating modified first and second data tables respectively consistent with the modified first and second normalized data tables.

10. A computer program product according to claim 7, wherein said first executable code portion for receiving at least first and second data tables includes executable code portions for communicating with at least one mobile device.

11. A computer program product according to claim 7, further comprising a seventh executable code portion for communicating at least one of the modified first and second data tables for receipt by a mobile device.

* * * * *